United States Patent [19]

Yasufuku et al.

[11] 4,399,443

[45] Aug. 16, 1983

[54] INK COMPOSITION AND METHOD FOR INK JET RECORDING

[75] Inventors: Yoshitaka Yasufuku; Yoshio Takeuchi; Yoshiaki Kimura, all of Hino, Japan

[73] Assignee: Konishiroku Photo Industry Co., Ltd., Tokyo, Japan

[21] Appl. No.: 336,026

[22] Filed: Dec. 30, 1981

[30] Foreign Application Priority Data

Jan. 14, 1981 [JP] Japan ................................. 56-3239
Apr. 10, 1981 [JP] Japan ................................ 56-54028

[51] Int. Cl.³ ........................................... G01D 15/16
[52] U.S. Cl. ..................................... 346/1.1; 106/22; 346/140 R
[58] Field of Search ................... 346/140 R, 75, 1.1; 106/22

[56] References Cited

U.S. PATENT DOCUMENTS

| | | | |
|---|---|---|---|
| 4,176,361 | 11/1979 | Kawada | 346/1.1 |
| 4,279,653 | 7/1981 | Makishima | 106/22 |
| 4,281,329 | 7/1981 | Yano | 346/1.1 |
| 4,361,843 | 11/1982 | Cooke | 346/1.1 |

FOREIGN PATENT DOCUMENTS

2031001 4/1980 United Kingdom .
2034947 6/1980 United Kingdom .
2038862 7/1980 United Kingdom .

OTHER PUBLICATIONS

Evans, J. F., Drop-On-Demand Ink Formulation, IBM TDB, vol. 23, No. 10, Mar. 1981, p. 4551.
Cadilhac et al., Penetrant in Aqueous Jet Inks, IBM TDB, vol. 24, No. 5, Oct. 1981, pp. 2245-2246.
Welch et al., High Viscosity Drop-On-Demand Inks, IBM TDB, vol. 24, No. 7B, Dec. 1981, pp. 3944-3945.

*Primary Examiner*—Joseph W. Hartary
*Attorney, Agent, or Firm*—Frishauf, Holtz, Goodman & Woodward

[57] ABSTRACT

An ink composition and method for ink jet recording are disclosed. The ink composition comprises a coloring agent and additives which are adjusted to bring the roundness of dots formed on a recording medium, such as paper, of from 50 to 80 g/m² , to be at least 0.75 where said roundness (D) is represented by the formula $$D = 4\pi \times S/L^2$$

where S is the area of each dot, L is the circumferential length of the dot and $\pi$ is the circular constant. The ink composition has good ink drop projection stability, good storage stability and a superior property for producing highly densed dots having an improved configuration close to a perfect circle on the recording medium.

20 Claims, No Drawings

INK COMPOSITION AND METHOD FOR INK JET RECORDING

The present invention relates to an ink composition and method for ink jet recording, and more particularly to an ink composition and method for ink jet recording, which give ink dots having an improved configuration close to a perfect circle.

As the ink jet recording system, there have been known a continuous jet type (which includes an electric charge control system, an electric field control system, an electric charge and field control system, and an electrostatic deflection control system), an electrostatic pull jet type, and an Impulse jet system (Drop-on-demand type).

The ink composition of the present invention can be used in any kind of these ink jet systems, but it is particularly advantageously used for the Impulse jet system.

The On-demand pressure pulse type ink jet recording system comprises the following two steps: a first step of suddenly reducing the volume of a fluid chamber filled with ink by application of an electric drive pulse to project an ink droplet from the front end of a nozzle, one droplet being projected each time an electric drive pulse is applied, and a second step of restoring the whole system to the initial state after each ejection of an ink droplet from the front end of the nozzle, thus bringing the system ready for the next projection. This system is disclosed, for instance, in U.S. Pat. Nos. 3,946,396, 3,946,398, 4,074,289, 4,123,761, 4,144,537, 4,162,501, 4,176,363, and 4,176,361, Japanese Laid-Open Patent Application Nos. 56414/77 and 82175/80 and Japanese Patent Publication No. 10916/78.

The ink compositions to be used for such an Impulse jet type ink jet recording system, like used for any other types of ink jet recording, are required not to cause clogging of the nozzle, not to undergo property changes during storage, to provide good ink drop projection stability and to give a sufficient density when recorded on a recording medium.

However, no ink composition has been known which fully satisfies both requirements for the ink drop projection stability and high density of ink dots thereby formed. Heretofore, emphasis has been placed on the projection stability and importance of the high density of ink dots has been more or less neglected.

The present inventors have conducted researches on the basis that in order to obtain dots of high density, the ink composition for the ink jet recording should be the one providing ink dots having a configuration of a perfect circle or a configuration close to it. It has been found, however, that determination of the roundness of the ink dots can not accurately be made by the observation with naked eyes of the observer. In other words, the judgement of the roundness of dots by the observation with naked eyes, as has been common in the conventional practice, is not reliable or satisfactory for the purpose of prepareing the desired ink composition. It is therefore necessary that the determination of the roundness of the ink dots be made more objectively based on certain parameters.

Accordingly, it is an object of the present invention to provide an ink composition for the ink jet recording, which can be prepared to give ink dots having a perfect circle or a configuration close to it by adjusting the composition to certain specific parameters, and thus to provide an ink composition which is capable of presenting ink dots of high density.

Another object of the present invention is to provide an ink composition having good ink drop projection stability, good storage stability and a superior property for producing highly densed dots on a recording medium.

A further object of the present invention is to provide an ink composition which can be used for any type of the ink jet recording.

The above objects of the present invention will be satisfied by an ink composition for ink jet recording, which comprises a colouring agent and additives which are adjusted to bring the roundness (D) of dots formed on a recording paper of from 50 to 80 g/m² (Paper Quality), to be at least 0.75 where said roundness (D) is represented by the formula $$D = 4\pi \times S/L^2 \qquad (I)$$

where S is an area of each dot, L is a length of the circumference of the dot and $\pi$ is the circular constant.

In the present invention, the determination of the roundness (D) according to the formula I to find out if it is at least 0.75, is made by forming ink dots on a recording medium, such as paper, of 50 to 80 g/m² by an ink jet system such as the above mentioned pressure pulse system, enlarging the dots by a dot analyser (e.g. "SAKURA HALFTONE DOTS ANALYSER" dot anylyser manufactured by Konishiroku Photo Ind. Co., Ltd.), tracing the enlarged dots appeared on a cathode ray tube (CRT) or reproduced on a hard copy, by means of proper drawing instruments to determine the circumferential length (L) and the area (S) of each dot, and then calculating the roundness (D) from the values L and S thus obtained, according to the formula I. In the method for adjustment according to the present invention, the kinds of the constituent components, amounts thereof and the viscosity of the ink composition are adjusted to bring the value of the roundness (D) to be at least 0.75, preferably at least 0.85. The selection of the kinds of the constituent components can be made based on the chemical structures of the dyes as the colouring agent and the solvent compositions of the ink composition.

The colouring agent used in the present invention is preferably a direct dye, particularly a water soluble direct dye. For instance, preferred as a direct dye useful for a black ink composition, is a dye (hereinafter referred to as "a direct dye in Group A") which has, in its molecule, amino groups or amino precursors capable of forming amino groups when hydrolyzed, at terminals of its chemical structure or at positions where free motion of said amino groups or precursors is not hindered by an interference of chemical bonds such as a hydrogen bond, and the total number of said amino groups and precursors is an integer of at least 3.

The ink composition of the present invention may further contain an additional direct dye (hereinafter referred to as "a direct dye in Group B") which has, in its molecule, a substituted amino group or an amino group having an intramolecular or intermolecular hydrogen bond, and not more than two free amino groups and amino precursors.

In general, the direct dyes in Group A are hydrophilic and have affinity with a recording paper (which is composed of cellulose and has a great deal of hydroxy groups), whereby ink dots are formed uniformly with high quality of roundness. Whereas the direct dyes in Group B have poor hydrophilic property and does not per se provide good roundness of dots. Nevertheless, when a direct dye in Group B is combined with a direct dye in Group A in the ink composition according to the present invention, a high quality of roundness can be obtained. The reason for such a high quality of roundness obtainable by the combination of the two types of the direct dyes is not yet clearly understood, but it is assumed that the density of dots is partially improved by colour-fixing effectiveness of the hydrohobic groups of the direct dye in Group B, which contributes to an overall improvement of the roundness of the formed ink dots.

The present invention also provides a method for projecting ink droplets onto a recording medium, which is improved by the use of the above mentioned ink composition.

Namely, the method of the present invention comprises filling a fluid chamber with an ink composition, said fluid chamber being in communication with a nozzle and having at least one portion of its wall adapted to be deflectable by an electro-mechanical transducer, deflecting the wall of said fluid chamber inwardly by the action of the electro-mechanical transducer upon application of an electric drive pulse, thereby suddenly reducing the volume within said fluid chamber to project one droplet of said ink composition from the nozzle towards a recording medium, one droplet being projected onto said recording medium each time said drive pulse is applied, restoring the volume within the fluid chamber after the ejection of one droplet to restore the initial equilibrium state of the ink composition in the chamber, in which said ink composition comprises a direct dye in Group A which has, in its molecule, amino groups or amino precursors capable of forming amino groups when hydrolyzed, at terminals of its chemical structure or at positions where free motion of said amino groups or precursors is not hindered by an interference of chemical bonds such as a hydrogen bond, and the total number of said amino groups and precursors is an integer of at least 3.

Now, the ink composition according to the present invention will be described in detail.

The amino groups in the direct dye in Group A are free amino groups commonly referred to as such in organic chemistry, i.e. amino groups which are not hindered for free motion by e.g. hydrogen bonds with the adjacent groups, and they are preferably amino groups attached at terminals of the dye molecule. The amino precursors are groups which yield amino groups when hydrolyzed, and a typical example thereof is an acylamino group a preferable example of said acylamino group is an acetylamino group, and a benzoylamino group.

The direct dyes in Group A according to the present invention are required to have the above mentioned basic structure. However, they may preferably contain a plurality of sulfo groups as well. Particularly preferred is a direct dye which has, in its molecule, a naphthol nucleus substituted by at least one sulfo group. The sulfo group mentioned here includes not only a free sulfo group but also a sulfo group which is substituted by an alkali metal such as sodium or potassium.

Specific examples of the dye in Group A will be given below.

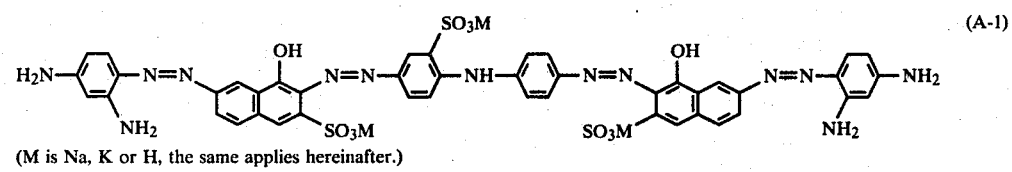

(M is Na, K or H, the same applies hereinafter.)

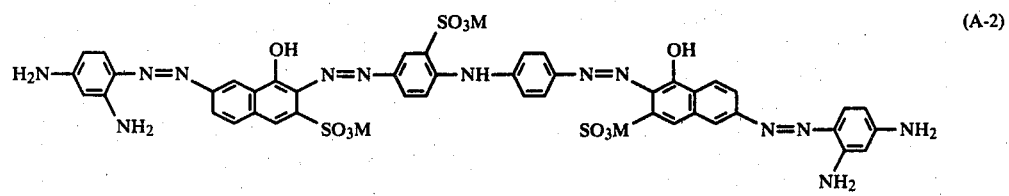

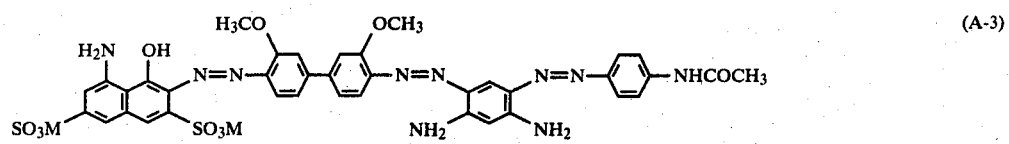

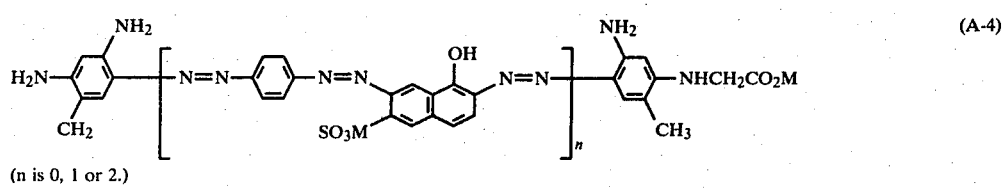

(n is 0, 1 or 2.)

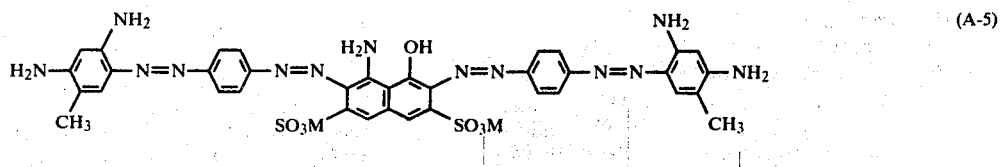

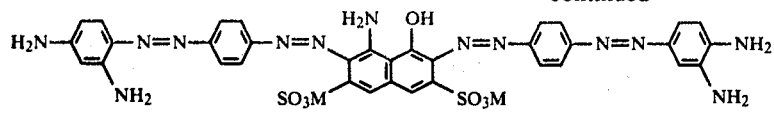
(A-6)

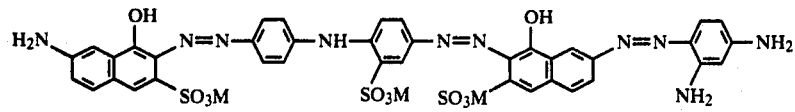
(A-7)

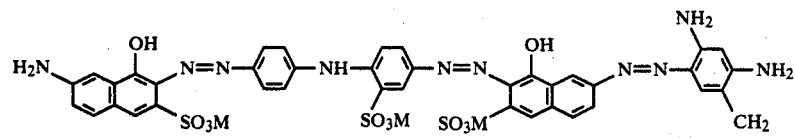
(A-8)

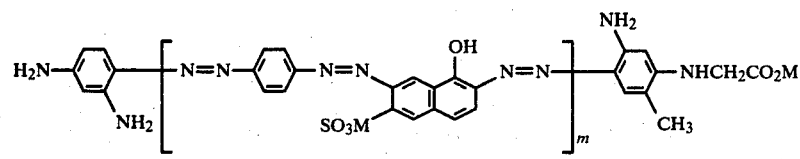
(A-9)

(m is 0, 1 or 2.)

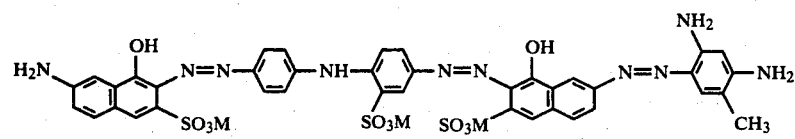
(A-10)

Among the above direct dyes in Group A, the Compounds A-1, A-3, A-5 and A-6 are preferred. Particularly preferred is the Compound A-6.

These dyes in Group A are known per se, and they are described in detail in "The Society of Dyes and Colorists in Cooperation with the American Association of Textile Chemists and Colorists, 1957").

The direct dyes in Group B are dyes having a relatively strong hydrohobic property, and, if used alone for an ink composition for ink jet recording, they provide extremely poor roundness of the formed dots. Further, they present a black colour with a strong reddish accent, and tend to give a faded black record with a sepia tone depending upon the nature of the recording paper. Accordingly, they can not be used alone for an ink composition for ink drop projection recording.

The substituted amino group of the direct dye in Group B is an amino group, of which at least one hydrogen atom is substituted by an optional substituent. As a suitable substituent, there may be mentioned, a substituted or unsubstituted alkyl group or aryl group. The substituent may further be substituted by an optional substituent such as a hydroxy group. However, the substituted amino group of the direct dye in Group B does not include a substituted amino group which yields an amino group when hydrolyzed.

A particularly preferred substituent for the substituted amino group is an ethyl group or a hydroxyethyl group.

The direct dye in Group B which has an amino group having an intramolecular or intermolecular hydrogen bond, is a dye which intramolecularly or intermolecularly has a group (e.g. a hydroxy group) which establishes a hydrogen bond with a hydrogen atom of an amino group, as in the case of e.g. an 8-amino-1-naphthol nucleus.

These direct dyes in Group B are known per se, and they are described in detail in the same reference as identified above with respect to the direct dyes in Group A.

Specific examples of the direct dye in Group B will be given below.

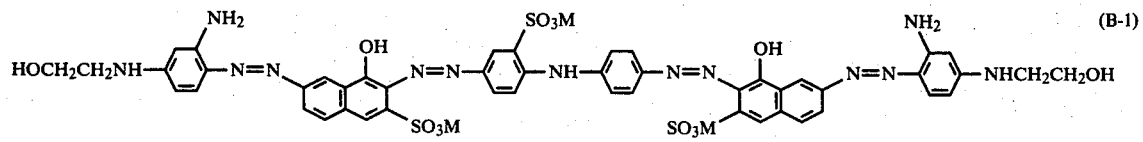
(B-1)

(M is Na or K; the same applies hereinafter.)

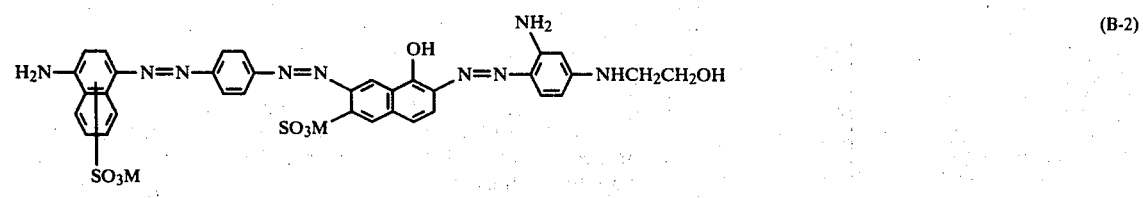
(B-2)

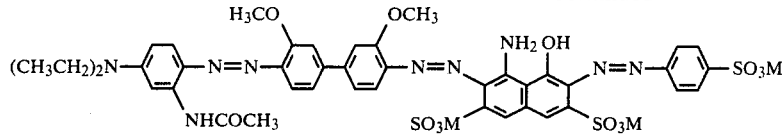

(B-3)

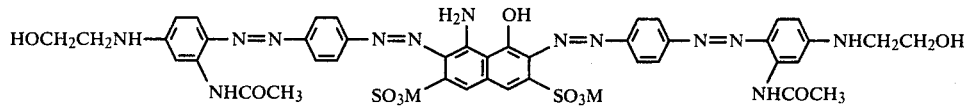

(B-4)

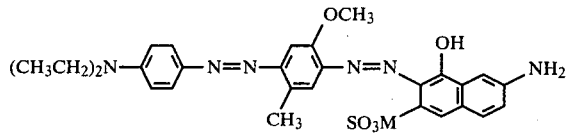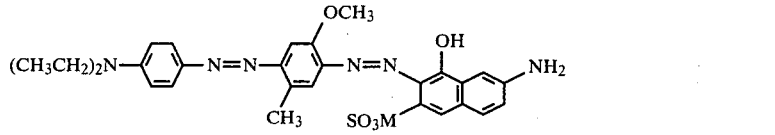

(B-5)

Among the above direct dyes in Group B, the Compound B-1 is particularly preferred.

In the ink composition of the present invention, the colouring agent, i.e. a dye or dyes, is incorporated in an amount of from 0.5 to 10% by weight, preferably from 1 to 8% by weight to bring the value of the above mentioned roundness (D) to be at least 0.75.

In the case where the direct dyes in Groups A and B are used in combination, their total amounts should fall within the above range, and their proportion may be optional put preferably be from 1:10 to 10:1, particularly from 1:5 to 5:1.

The ink composition of the present invention is a solution containing the above mentioned colouring agent, i.e. a dye or dyes, as an essential ingredient. The solution may be aqueous using water as the major component. However, it is preferred that the solution comprises an organic solvent as the major solvent.

In the present invention, the solution comprising an organic solvent as the major solvent is meant for a solution wherein at least 50% of the solvent composition is made up with an organic solvent. As the solvent composition, a solvent mixture of water-glycol type is preferred.

The glycol used in the water-glycol solvent mixture for dissolving the colouring agent, is ethylene glycol, diethylene glycol, triethylene glycol, a polyethylene glycol (which is preferably the one having an average molecular weight of at most 1000), or these glycols, of which one of the hydroxy groups is etherified, such as butyl carbitol, diethylene glycol monomethyl ether, diethylene glycol monoethyl ether, or ethoxy ethanol. The glycol has an average molecular weight of not more than 1000, preferably not more than 800. The glycols may be used alone or as a mixture of 2 to 5 different kinds. It is preferred to use two or three glycols in combination.

In the ink composition of the present invention, a stabilizer may be incorporated to improve the storage stability of the composition. The stabilizer is the one serving to prevent precipitation of solids in the ink composition during the storage or when the ink jet apparatus is not in operation, thereby to avoid clogging of the nozzle, or to stabilize the ink jet at the time of the operation (i.e. to prevent the formation of solids or foreign matters in the ink composition at the nozzle head surface). For this purpose, an acetate is most suitable according to the present invention. When an acetate is used, its buffer effect is believed to contribute to the good result. A phosphate likewise has a buffer effect, but it is not desirable as it promotes the development of bacteria or it facilitates the property change of the ink composition with time. Among acetates, sodium acetate and potassium acetate are preferred, and they may be incorporated in an optional amount, but preferably in an amount of from 0.01 to 5% by weight, particularly from 0.05 to 4% by weight.

The viscosity of the ink composition of the present invention may be set at an optional level as the case requires, but it is preferably set to be from 1.80 to 15.00 centi-poise (hereinafter abbreviated as "CP") at 30° C. The viscosity of the ink composition is important especially for the stabilized formation of ink droplets by the Ondemand pressure pulse type ink jet system. The stabilized formation of ink droplets here is meant for the projection of a single ink droplet each time a pulse from a piezoelectric transducer is applied and a pressure is thereby exerted to a fluid chamber by the piezoelectric driving means, without formation of mist of ink particles, without substantial fluctuation in the size of ink droplets, or without formation of tiny ink particles i.e. so-called satellites other than the major droplets. The viscosity of the ink composition is more preferably from 2.0 to 4.0 CP at 30° C. Further, the surface tension of the ink composition is equally important, and it is preferably from 40 to 60 dyn/cm as the surface tension of the ink composition for the Ondemand pressure pulse type ink jet system.

In the present invention, it is preferred to use an antiseptic as one of the additives. The antiseptic serves to prevent or minimize the development and growth of bacteria or fungi. Bacteria are likely to deposit within the nozzle thus causing clogging, or in an extreme case, they lead to degradation of the physical properties of the ink. Various anticeptics may be incorporated in the ink composition of the present invention, alone or in combination of two or more kinds. As preferred examples of the antiseptic, there may be mentioned, for instance, dioxine (6-acetoxy-2,4-dimethyl-m-dioxine), Bacillat (hexahydrotriazine derivatives) commercially available from Hoechst AG, Bestcide-1087(2-hydroxymethylaminoethanol 90% aqueous solution) commercially available from Dainippon Ink Chem. Ind. Co., Ltd., potassium sorbate, Preventol CMK-Na (3-methyl-4-chlorophenol), and sodium-2-pyridine thiol-1-oxide commercially available from Bayer AG. The amount of the antiseptic is from 0.01 to 4.0% by weight, preferably from 0.02 to 3.5% by weight.

In some cases, it is desirable to incorporate various chelating agents for the purpose of masking metals or metal ions in the ink composition. As typical examples of such chelating agents, there may be mentioned sodium glyconate, ethylenediamine tetracetic acid (EDTA), disodium salt thereof, trisodium salt thereof, and tetrasodium salt thereof, and sodium diethylene triaminopentaacetate. The amount of such a chelating agent is from 0.02 to 2.0% by weight, preferably from 0.05 to 1.0% by weight.

Further, a fluorine type surface active agent or a polyoxyalkylene may be added to improve the properties of the ink composition as the case requires.

Further, it is desirable to add a small amount of a salt of an inorganic base for the purpose of stably dissolving the direct dyes in the water-glycol type solvent mixture. The salt of the inorganic base must be the one which does not adversely affect the storage stability of the ink composition i.e. the one which does not lead to precipitation of the inorganic salt during the storage which causes clogging of the nozzle. As a preferred salt, there may be mentioned a carbonate. Particularly preferred is sodium carbonate or potassium carbonate.

In the present invention, a salt of an organic base may be used in combination with the salt of an inorganic base to improve the properties of the ink composition. As such a salt of an organic base, various amines, particularly aliphatic amines, are preferred. More preferably, they are not primary amines. As preferred examples, there may be mentioned triethanol amine and permethylated tetraethylene pentamine.

Examples of the present invention will be given below. However, it should be understood that the present invention is not limited to these specific Examples. Further, in the following Examples, an ink jet printer, Erea Attack (manufactured by Konishiroku Photo. Ind. Co., Ltd.) was used which is an Ondemand pressure pulse type having multi-nozzles, and the orifice of the nozzles at the front end of the ink jet printer was 4000 μm², 2800 μm² or 2200 μm².

Now, the invention will be described with reference to the Examples.

EXAMPLE 1

Carta Black G 140% (C.I. No. 35255, Direct Black 19), a direct dye manufactured by Sandoz Co., was refined to obtain a colouring agent for the ink composition in accordance with the following process.

450 g of "Carta Black G 140%" was added to 3 l of an aqueous solution containing 14% of sodium acetate trihydrate, and stirred for one hour at room temperature, and the precipitates were filtered, dried, washed with a 3% sodium acetate aqueous solution and further washed with a small amount of water. The remaining solids were washed with ethanol, further washed with ethanol containing a small amount of water (i.e. a few percent of water), and then dried, whereupon the forementioned Compound A-6 was obtained. The amount thereof was 970 g (yield: 60%).

In the preparation of the following ink compositions, dyes refined in the same manner were used.

Ink Composition A was prepared in the following manner:

| | |
|---|---|
| Compound A-6 refined as above | 28 g |
| Ethylene glycol | 484 g |
| Diethylene glycol | 56 g |
| Triethylene glycol | 56 g |
| Potassium carbonate (anhydrous) | 2 g |
| Tetrasodium ethylenediamine tetraacetate | 2 g |
| Sodium acetate trihydrate | 0.5 g |
| 2-Hydroxymethylaminoethanol (90% aqeuous solution) | 1 g |
| Distilled water To bring the total weight to be | 1000 g |

The above mixture was repeatedly filtered and finally filtered by a filter having a pore size of 0.6μ. The mixture thus obtained had a viscosity of 5.0 CP (at 30° C.), and a surface tension of 51 dyn/cm.

With use of the ink composition thus obtained, printing was carried out by the ink jet printer and the configurations of the dots thereby obtained were investigated, whereby the roundness (D) according to the formula I was found to be 0.92. The configurations of the dots thereby obtained were observed to be almost perfect circles by naked eyes, and the dots exhibited high density. The recording paper used was recording paper for ink jet recording manufactured by Mitsubishi Paper Mills Co., Ltd. (S-type, 68 g/m²).

EXAMPLE 2

Ink Composition B was prepared in the same manner as in Example 1 except that the following Compound A-A was used instead of Compound A-6. The roundness (D) of the Ink Composition B was found to be 0.74. The configurations of the dots thereby obtained were not perfect circles when observed by naked eyes, and the dots had low density.

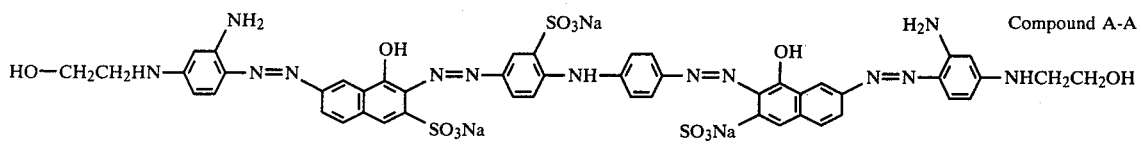

The Compound A-A was prepared by refining a dye called Dialuminus Black AB (C.I. No. 35440, Direct Black 39) manufactured by Mitsubishi Chemical Industries, Ltd., in the same manner as for the Compound 6 of Example 1.

It is apparent from this Example that in the case where the Compound A-A having, in its molecule, only two amino groups, is used, the roundness thereby obtained is extremely inferior to the case where the Compound A-6 having at least 3 amino groups is used, and that the structure of the dye used in the ink composition gives a great influence over the density of the dots thereby obtainable. Further, the Ink Composition B of this Example had a viscosity of 6.0 CP (at 30° C.) and a surface tension of 52 dyn/cm.

EXAMPLE 3

Ink Composition C was prepared in the same manner as in Example 1 except that the Compound A-1 was used instead of the Compound A-6. The roundness (D) of the Ink Composition C was found to be 0.89. The dots thereby obtained were close to perfect circles as observed by naked eyes, and had high density.

The Compound A-1 used in this Example is similar to the Compound A-A of Example 2 except that it has four terminal amino groups. From this, it is apparent that the number of amino groups is quite influencial over the dot density.

The Ink Composition C of this Example had a viscosity of 5.1 CP (at 30° C.) and a surface tension of 47 dyn/cm. The Compound A-1 was prepared by refining a dye called Sumilight Black A (C.I. No. 35435, Direct Black 22) manufactured by Sumitomo Chemical Co., Ltd. in the same manner as in the case of the Compound A-6 of Example 1.

EXAMPLE 4

Ink Composition D was prepared in the same manner as in Example 1 except that sodium monohydrogen phosphate (anhydrous) was used instead of sodium acetate trihydrate as the stabilizer of the Ink Composition A. The Ink Compositions A and D were stored at 55° C. for seven days, whereupon the Ink Composition A of Example 1 did not show a substantial change in its viscosity, whereas the Ink Composition D underwent a substantial viscosity change.

| Ink Composition of Example 1 | |
| --- | --- |
| Viscosity prior to the storage | 5.0 CP (at 30° C.) |
| After the storage at 55° C. for 7 days | 4.9 CP (at 30° C.) |
| Ink Composition D | |
| Viscosity prior to the storage | 5.0 CP (at 30° C.) |
| After the storage at 55° C. for 7 days | 6.1 CP (at 30° C.) |

Thus, sodium acetate as a stabilizer exhibited superior stabilizing effectiveness for the ink composition over another inorganic salt having a buffer effect.

Further, the ink composition in which sodium monohydrogen phosphate, showed a tendency to facilitate the development of fungi.

EXAMPLE 5

Ink Composition E was prepared in the following manner:

| Compound A-6 | 31 g |
| --- | --- |
| Ethylene glycol | 364 g |
| Sodium carbonate (anhydrous) | 2.5 g |
| Tetrasodium ethylenediamine tetraacetate | 2.0 g |
| Potassium acetate | 0.7 g |
| Breventol CMK-Na | 1.0 g |
| Water    To bring the total weight to be | 1000 g |

The above mixture was finally filtered by a filter having a pore size of 0.6μ. The Ink Composition E thereby obtained had a viscosity of 2.5 CP (at 30° C.) and a surface tension of 55 dyn/cm.

With use of this Ink Composition E, printing was carried out by the ink jet printer, and the roundness was investigated (whereby as the recording paper, recording paper for ink jet recording manufactured by Mitsubishi Paper Mills Co., Ltd. (S-type, 58 g/m²) was used), whereupon the roundness (D) was found to be 0.91, and the dots thereby obtained were perfect circles as observed by naked eyes and had high density.

EXAMPLE 6

The Ink Composition A prepared in Example 1 was printed on various papers as identified below, whereby the roundness (D) of the dots thereby obtained was as follows:

| Kinds of paper | Roundness (D) |
| --- | --- |
| Recording Paper for Ink Jet Recording manufactured by Mitsubishi Paper Mills Co., Ltd. (S-type, 62 g/m²) | 0.90 |
| Recording Paper for Ink Jet Recording manufactured by Mitsubishi Paper Mills Co., Ltd. (S-type, 58 g/m²) | 0.90 |
| "Diaform" quality paper manufactured by Mitsubishi Paper Mills Co., Ltd. (64 g/m²) | 0.97 |
| "Tomoe" quality paper manufactured by Mitsubishi Paper Mills Co., Ltd. (50 g/m²) | 0.97 |
| Recording paper for PPC copier "U-BIX" Konishiroku Photo. Ind. Co., Ltd. | 0.92 |

The dots obtained in each of the above cases were approximately perfect circles as observed by naked eyes and had high density.

EXAMPLE 7

Ink Composition F containing Compound A-6 in Group A and Compound B-1 in Group B was prepared to have the following formulation. The Composition F was printed on recording paper by the ink jet printer manufactured by Konishiroku Photo. Ind. Co., Ltd., and the quality of the dots thereby obtained was investigated. The recording paper used for the printing was recording paper for ink jet recording manufactured by Jujo Seishi K.K.

| Compound A-6 | 12.5 g |
| --- | --- |
| Compound B-1 | 12.5 g |
| Ethylene glycol | 435 g |
| Diethylene glycol | 100 g |
| Triethylene glycol | 100 g |
| Potassium carbonate (anhydrous) | 2.0 g |
| Tetrasodium ethylenediamine tetraacetate | 2.0 g |
| Besticide (manufactured by Dainippon Ink K.K.) | 1.0 g |
| Distilled water    To bring the total weight to | 1000 g |

The above mixture was repeatedly filtered and finally filtered by a filter having a pore size of 0.6 μm, whereupon Ink Composition F according to the present invention was obtained which had a viscosity of 6.8 CP (at 30° C.) and a surface tension of 52 dyn/cm.

This Ink Composition F did not lead to clogging and it exhibited good projection stability and showed good storage stability even at a high temperature storage (at 60° C.). Namely, it was found to be a good ink composition which satisfies all the fundamental requirements as the ink composition for ink jet recording.

Further, the dot density and roundness which are decisive to the quality of dots were as follows:

| The proportion of the area having density of 1.0 in a dot | 32% |
| --- | --- |
| Roundness | 0.93 |

COMPARATIVE INK COMPOSITION F'

For the purpose of comparison, Comparative Ink Composition F' was prepared by eliminating Compound B-1 and increasing the amount of Compound A-6 to 25.0 g, the rest being the same as the above Ink Composition F. The fundamental properties (i.e. the ink drop projection stability and storage stability) of the Ink Composition F' were as good as the Ink Composition F. It has a viscosity of 6.8 CP (at 30° C.) and a surface tension of 52 dyn/cm.

On the other hand, the factors decisive to the quality of dots were as follows:

| | |
|---|---|
| The proportion of the area having density of 1.0 in a dot | 15% |
| Roundness | 0.93 |

It is seen that the Ink Composition F' gives fairly good roundness and adequate density. However, the Ink Composition F gives even substantially better density.

The dots were about 310 μm in both cases.

COMPARATIVE INK COMPOSITION F"

For the purpose of comparison, Ink Composition F" was prepared by eliminating Compound A-6 and increasing the amount of Compound B-1 to 25 g, the rest being the same as the above Ink Composition F. The fundamental properties (i.e. the ink drop projection stability and storage stability) of the Ink Composition F" were as good as the Ink Composition F. It had a viscosity of 6.8 CP (at 30° C.) and a surface tension of 52 dyn/cm.

On the other hand, the factors decisive to the quality of dots were as follows:

| | |
|---|---|
| The proportion of the area having density of 1.0 in a dot | 20% |
| Roundness | 0.72 |

It is seen that the Ink Composition F is substantially superior in the dot density and roundness to the Ink Composition F".

EXAMPLE 8

Ink Composition J of the present invention was prepared in the same manner as in Example 7 except that the Compound A-1 was used instead of the Compound A-6. The recording paper used was recording paper for ink jet recording (M-type) manufactured by Mitsubishi Paper Mills Co., Ltd. The Ink Composition J had a viscosity of 6.8 CP (at 30° C.) and a surface tension of 52 dyn/cm.

An ink projection test was carried out with use of the same apparatus as used in Example 1, whereupon it was found that the Ink Composition J had good ink drop projection stability. It also had good storage stability.

On the other hand, the following results were obtained with respect to the ink dots.

| | |
|---|---|
| The proportion of the area having density of 1.0 in a dot | 13% |
| Roundness | 0.91 |

With use of the same recording paper, the Ink Composition F' of Example 7 was printed thereon. The following results were obtained with respect to the dots thus printed.

| | |
|---|---|
| The proportion of the area having density of 1.0 in a dot | 6% |
| Roundness | 0.89 |

It is seen that the Ink Composition J is substantially better in the dot density than the Ink Composition F'.

The dots were about 350 μm in each case.

EXAMPLE 9

Ink Composition K was prepared in the same manner as in Example 7 to have the following formulation.

| | |
|---|---|
| Compound A-6 | 17.5 g |
| Compound B-1 | 7.5 g |
| Ethylene glycol | 434 g |
| Diethylene glycol | 100 g |
| Triethylene glycol | 100 g |
| Potassium carbonate (anhydrous) | 2 g |
| Tetrasodium ethylenediamine tetracetate | 2 g |
| Sodium acetate trihydrate | 1 g |
| Breventol CMK-Na (Bayer AG) | 1 g |
| Distilled water   To bring the total weight to | 1000 g |

The fundamental properties (i.e. the ink drop projection stability and storage stability) of the Ink Composition K thus prepared were good.

On the other hand, printing was carried out by the ink jet printer of Konishiroku Photo. Ind. Co., Ltd. to see the quality of the dots thereby formed. The recording paper used was recording paper for ink jet recording (S-type) manufactured by Mitsubishi Paper Mills Co., Ltd. The results obtained were as follows:

| | |
|---|---|
| Roundness | 0.90 |
| Dot diameter | about 210 μm |

Printing was carried out with the Ink Composition F" of Example 7 on the same recording paper, whereby the following results were obtained.

| | |
|---|---|
| Roundness | 0.68 |
| Dot diameter | about 220 μm |

It is seen that the Ink Composition K is superior in the roundness to the Ink Composition F".

We claim:

1. An ink composition for ink jet recording, which comprises a colouring agent and additives which are adjusted to bring the roundness (D) of dots formed on a recording paper of from 50 to 80 g/m², to be at least 0.75 where said roundness (D) is represented by the formula $$D = 4\pi \times S/L^2$$

where S is an area of each dot, L is a length of the circumference of the dot and π is the circular constant.

2. The ink composition as claimed in claim 1, in which the colouring agent is a direct dye.

3. The ink composition as claimed in claim 2, in which the direct dye is a direct dye in Group A which has, in its molecule, amino groups or amino precursors capable of forming amino groups when hydrolyzed, at terminals of its chemical structure or at positions where free motion of said amino groups or precursors is not hindered by an interference of chemical bonds such as a hydrogen bond, and the total number of said amino groups and precursors is an integer of at least 3.

4. The ink composition as claimed in claim 3, which comprises an additional direct dye in Group B which has, in its molecule, a substituted amino group or an amino group having an intramolecular or intermolecular hydrogen bond, and not more than two free amino groups and amino precursors.

5. The ink composition as claimed in claim 3 or 4, in which the direct dye in Group A additionally has a plurality of sulfo groups.

6. The ink composition as claimed in claim 3 or 4, in which the direct dye in Group A has, in its molecule, a naphthol nucleus.

7. The ink composition as claimed in claim 4, in which the substituent of the substituted amino group of the direct dye in Group B is a substituted or unsubstituted alkyl group or aryl group.

8. The ink composition as claimed in claim 7, in which said substituent is an ethyl group or a 2-hydroxyethyl group.

9. The ink composition as claimed in claim 3 or 4, which is a solution comprising an organic solvent as the major solvent.

10. The ink composition as claimed in claim 9, in which the organic solvent is a glycol.

11. The ink composition as claimed in claim 1, 2, 3 or 4, which has a viscosity of from 1.80 to 15.00 centi-poise at 30° C.

12. in a method of projecting ink droplets onto a recording medium comprising filling a fluid chamber with an ink composition, said fluid chamber being in communication with a nozzle and having at least one portion of its wall adapted to be deflectable by an electro-mechanical transducer, deflecting the wall of said fluid chamber inwardly by the action of the electro-mechanical transducer upon application of an electric drive pulse, thereby suddenly reducing the volume within said fluid chamber to project one droplet of said ink composition from the nozzle towards a recording medium, one droplet being projected onto said recording medium each time said drive pulse is applied, restoring the volume within the fluid chamber after the ejection of one droplet to restore the initial equilibrium condition for the ink composition in the chamber, the improvement in which said ink composition comprises a direct dye in Group A which has, in its molecule, amino groups or amino precursors capable of forming amino groups when hydrolyzed, at terminals of its chemical structure or at positions where free motion of said amino groups or precursors is not hindered by an interference of chemical bonds such as a hydrogen bond, and the total number of said amino groups and precursors is an integer of at least 3.

13. The method as claimed in claim 12, in which said ink composition comprises an addition direct dye in Group B which has, in its molecule, a substituted amino group or an amino group having a intramolecular or intermolecular hydrogen bond, and not more than two free amino groups and amino precursors.

14. The method as claimed in claim 12 or 13, in which the direct dye in Group A additionally has a plurality of sulfo groups.

15. The method as claimed in claim 12 or 13, in which the direct dye in Group A has, in its molecule, a naphthol nucleus.

16. The method as claimed in claim 13, in which the substituent of the substituted amino group of the direct dye in Group B is a substituted or unsubstituted alkyl group or aryl group.

17. The method as claimed in claim 16, in which said substituent is an ethyl group or a 2-hydroxyethyl group.

18. The method as claimed in claim 12 or 13, in which the ink composition is a solution comprising an organic solvent as the major solvent.

19. The method as claimed in claim 18, in which the organic solvent is a glycol.

20. The method as claimed in claim 12, 13, 14 or 15, in which the ink composition has a viscosity of from 1.80 to 15.00 centi-poise at 30° C.

* * * * *